(12) United States Patent
King

(10) Patent No.: US 9,648,310 B2
(45) Date of Patent: May 9, 2017

(54) SYSTEMS AND METHODS FOR MASK ADJUSTMENT IN 3D DISPLAY

(75) Inventor: Lawrence King, Newmarket (CA)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 13/404,612

(22) Filed: Feb. 24, 2012

(65) Prior Publication Data

US 2013/0113786 A1    May 9, 2013

Related U.S. Application Data

(60) Provisional application No. 61/557,800, filed on Nov. 9, 2011.

(51) Int. Cl.
G06T 15/00    (2011.01)
G09G 5/00    (2006.01)
H04N 13/04    (2006.01)

(52) U.S. Cl.
CPC ..... H04N 13/0409 (2013.01); H04N 13/0472 (2013.01)

(58) Field of Classification Search
CPC .......................... H04N 13/047; H04N 13/0409
USPC .................................... 348/51; 345/156, 419
See application file for complete search history.

(56) References Cited

U.S. PATENT DOCUMENTS

| | | | |
|---|---|---|---|
| 6,061,084 A | 5/2000 | Perlin | |
| 6,603,442 B1 | 8/2003 | Hong | |
| 7,190,518 B1 | 3/2007 | Kleinberger et al. | |
| 7,653,213 B2 | 1/2010 | Longhurst et al. | |
| 2002/0030888 A1 | 3/2002 | Kleinberger et al. | |
| 2005/0207486 A1 | 9/2005 | Lee et al. | |
| 2006/0103932 A1 | 5/2006 | Relke et al. | |
| 2006/0139447 A1 | 6/2006 | Unkrich | |
| 2006/0203339 A1* | 9/2006 | Kleinberger et al. | 359/465 |
| 2010/0060983 A1* | 3/2010 | Wu et al. | 359/466 |
| 2010/0253768 A1 | 10/2010 | El-Maraghi et al. | |
| 2011/0037830 A1 | 2/2011 | Pockett | |
| 2011/0063419 A1 | 3/2011 | Lee et al. | |
| 2011/0292042 A1* | 12/2011 | Vaganov | 345/419 |
| 2011/0304695 A1* | 12/2011 | Lim et al. | 348/46 |
| 2012/0033298 A1* | 2/2012 | Hsiao | 359/462 |
| 2012/0050268 A1* | 3/2012 | Kim | H04N 13/0497 345/419 |

(Continued)

FOREIGN PATENT DOCUMENTS

EP    2395762 A2    12/2011

OTHER PUBLICATIONS

International Search Report and Written Opinion—PCT/US2012/060850—ISA/EPO—May 27, 2013.
Taiwan Search Report—TW101140179—TIPO—May 25, 2015.

*Primary Examiner* — Gims Philippe
*Assistant Examiner* — On S Mung
(74) *Attorney, Agent, or Firm* — Knobbe Martens Olson & Bear LLP

(57) ABSTRACT

Certain embodiments relate to systems and methods for presenting a stereoscopic, 3-dimensional image to a user. The system may comprise a mobile device having a camera and a pixel-selective mask overlaying a display. The system may perform facial and object recognition techniques to determine the location of the user's eyes. Subsequently, the system may adjust the mask so as to maintain an optimal stereoscopic effect for the user, regardless of the user's position.

25 Claims, 9 Drawing Sheets

(56) References Cited

U.S. PATENT DOCUMENTS

2012/0200680 A1* 8/2012 So ..................... H04N 13/0413
                                                         348/54

* cited by examiner

SYSTEMS AND METHODS FOR MASK ADJUSTMENT IN 3D DISPLAY

CROSS-REFERENCE TO RELATED APPLICATIONS

This application claims the benefit under 35 U.S.C. Section 119(e) of commonly-assigned U.S. Provisional Patent Application Ser. No. 61/557,800, filed on Nov. 9, 2011, entitled "SYSTEMS AND METHODS FOR MASK ADJUSTMENT IN 3D DISPLAY TECHNOLOGY" which application is incorporated by reference herein in its entirety.

TECHNICAL FIELD

The systems and methods disclosed herein relate generally to the display of three-dimensional images to a user, possibly from a mobile device.

BACKGROUND OF THE INVENTION

Current 3D displays, such as may be found on handheld devices, may use a mask to obscure odd pixels from the right eye and to obscure even pixels from the left eye (or vice versa). By obscuring pixels the system may selectively display each image of a stereoscopic image pair to the user's eyes. Unfortunately, separation of stereoscopic image pairs in this manner may impose undesired constraints upon the user. Particularly, the location at which the 3D image may be visible to the user may be very limited. This location, referred to herein as a 'sweet spot' or 'stereoscopic focus position' may comprise a very narrow range of positions. The stereoscopic focus position may generally be located at a point along a vector normal to the display and may depend upon the spacing between the viewer's eyes. There exists a need for a more versatile means for comfortably presenting a user with a 3D stereoscopic effect.

Standard Single-Masks

FIG. 1 illustrates a configuration 200 wherein a left eye 201A (relative to the screen rather than the user's point of view) and a right eye 202a are depicted relative to a mask 204 selectively obscuring even 206 and odd 207 pixels from each of the eyes' views. As illustrated, openings in the mask 204 relative to the eyes 201a, 202a of the user are such that when the eyes are in the stereoscopic focus position 102 the left eye 201a perceives substantially only the odd pixels 207 and the right eye 202a perceives substantially only the even pixels 206. In this manner the device may display a first image of a stereoscopic pair to the user on the even pixels 206 and a second image of the pair to the user on the odd pixels 207. So long as the user's eyes 201a, 202a remain in the stereoscopic focus position 102, the user will perceive an optimal three-dimensional effect when viewing screen 105, or similar means for displaying a stereoscopic image. Many current 3D display systems selectively display left and right images to user's left and right eyes respectively using a pixel-obscuring mask such as this one. Such a system, referred to as "auto-stereoscopic" display, removes the need for the user to wear special glasses having lenses which selectively filter each of the left and right images. Unfortunately, as discussed above, the masks in these auto-stereoscopic systems may only facilitate the stereoscopic effect when the user is situated at a particular location relative to the display referred to as a "sweet spot" or "stereoscopic focus position". Should the user move outside of this "stereoscopic focus position" the stereopsis-induced 3D effect may no longer be achieved or may be achieved less favorably. Typically, the stereoscopic focus position may be at a location normal to the display and within a specific range which may be based on the spacing between a user's eyes.

Using a device with a very limited stereoscopic focus position may impose considerable strain upon the viewer's eyes, arms, back and neck. Accordingly, there is a need for an economic and efficient system to adjust the stereoscopic focus position based upon the user's position relative to the device.

SUMMARY OF THE INVENTION

Certain embodiments contemplate a computer-implemented method for rendering a stereoscopic effect for a user. The method may comprise: receiving an image, the image containing a portion of the user's face; determining a location corresponding to the user's eyes; determining a width between the user's eyes based on the image; and moving a stereoscopic focus position from a first position to a second position by adjusting a mask on a 3D display based on the first location and the width.

In some embodiments, the second position corresponds to the location of the user's eyes. In some embodiments, the first position is further from the 3D display than the second position and adjusting the mask comprises moving the mask closer to the 3D display. In some embodiments, adjusting the mask comprises modifying a distance between separations within the mask. In some embodiments the step of determining the location corresponding to the user's eyes is based on the image. In some embodiments, the step of determining the location of the user's eyes comprises retrieving location information from memory.

Certain embodiments contemplate a device for rendering a stereoscopic effect for a user, the device comprising: a camera; a display configured to display a stereoscopic image pair; and a mask over the display. The device may also comprise a module configured to receive an image from the camera, the image containing a portion of the user's face; a module configured to determine a location corresponding to the user's eyes; a module configured to determine a width between the user's eyes based on the image; and a module configured to move a stereoscopic focus position from a first position to a second position by adjusting the mask based on the first location and the width.

In some embodiments, the second position corresponds to the location of the user's eyes. In some embodiments, the first position is further from the 3D display than the second position and adjusting the mask comprises moving the mask closer to the 3D display. In some embodiments, adjusting the mask comprises modifying a distance between separations within the mask. In some embodiments, the step of determining the location corresponding to the user's eyes is based on the image. In some embodiments, the step of determining the location of the user's eyes comprises retrieving location information from memory.

Certain embodiments contemplate a non-transitory computer-readable medium comprising instructions configured to cause one or more computer systems to perform a method. The method may comprise: receiving an image, the image containing a portion of the user's face; determining a location corresponding to the user's eyes; determining a width between the user's eyes based on the image; and moving a stereoscopic focus position from a first position to a second position by adjusting a mask on a 3D display based on the first location and the width.

In some embodiments the second position corresponds to the location of the user's eyes. In some embodiments, the first position is further from the 3D display than the second position and adjusting the mask comprises moving the mask closer to the 3D display. In some embodiments, adjusting the mask comprises modifying a distance between separations within the mask. In some embodiments, the step of determining the location corresponding to the user's eyes is based on the image. In some embodiments, the step of determining the location of the user's eyes comprises retrieving location information from memory.

Certain embodiments contemplate a device for rendering a stereoscopic effect for a user. The device may comprise: a camera; means for displaying a stereoscopic image pair; means for masking the display; and means for receiving an image from the camera. The image may contain a portion of the user's face. The device may also comprise means for determining a location corresponding to the user's eyes; means for determining width between the user's eyes based on the image; and means for moving a stereoscopic focus position from a first position to a second position by adjusting the masking means based on the first location and the width.

In some embodiments, the displaying means comprises a display, the masking means comprises a mask, the receiving means comprises a software module, the determining a location means comprises a software module, the determining a width means comprises a software module, and the moving means comprises a software module configured to operate an actuator.

In some embodiments, the second position corresponds to the location of the user's eyes. In some embodiments, the first position is further from the 3D display than the second position and adjusting the mask comprises moving the mask closer to the 3D display. In some embodiments, adjusting the mask comprises modifying a distance between separations within the mask. In some embodiments, the step of determining the location corresponding to the user's eyes is based on the image. In some embodiments, the step of determining the location of the user's eyes comprises retrieving location information from memory.

DETAILED DESCRIPTION

System Overview

Implementations disclosed herein provide systems, methods and apparatus for generating a stereoscopic image with an electronic device having one or more imaging sensors. The present embodiments further contemplate monitoring the position of a user's eyes and adjusting a mask over a display of the electronic device in response. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination may correspond to a return of the function to the calling function or the main function, or a similar completion of a subroutine or like functionality.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 1:
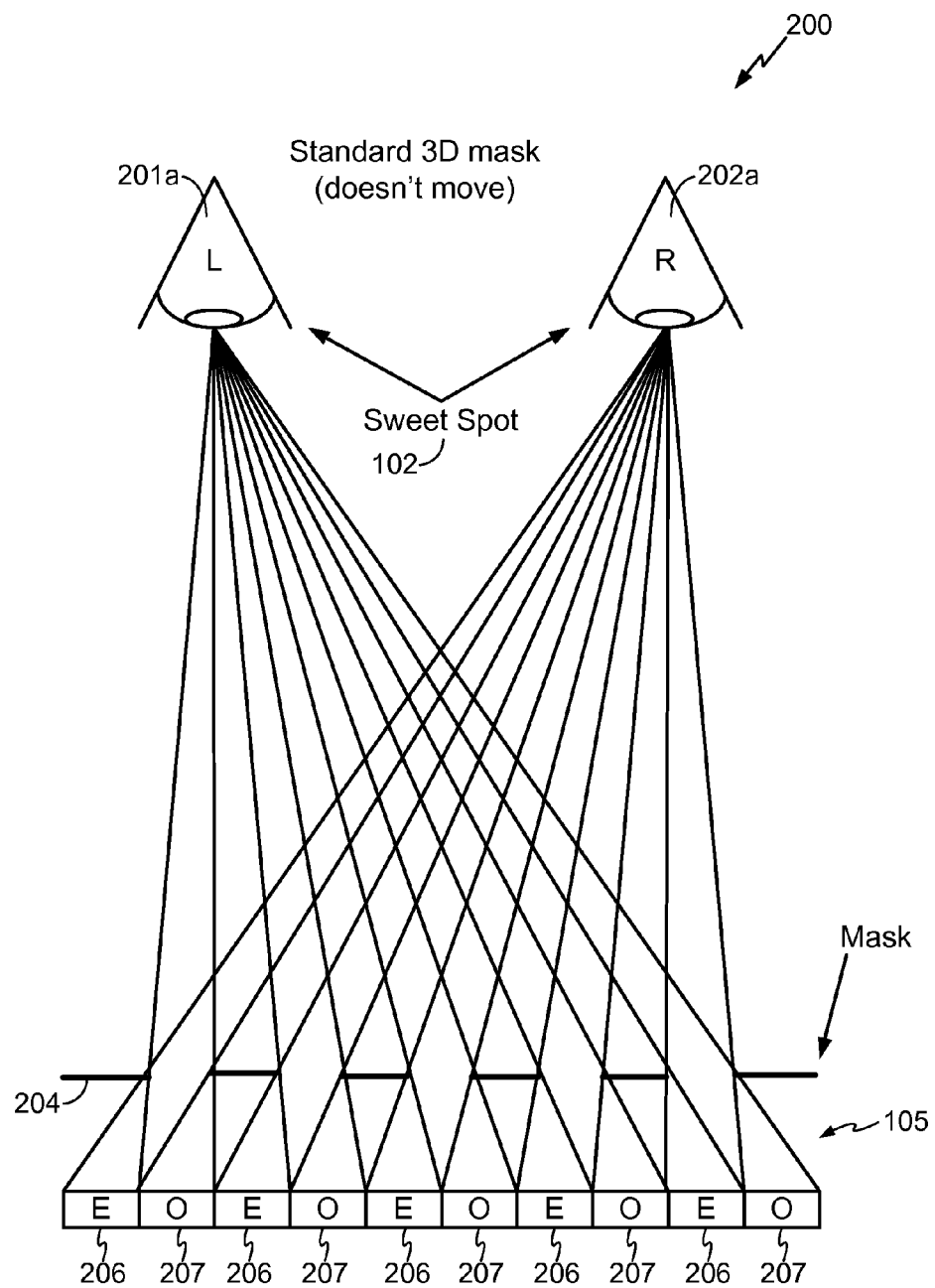
FIG. 1 illustrates a prior art configuration wherein a fixed mask is used to selectively display a left and right stereoscopic image to each of a user's eyes.
Figure 2:
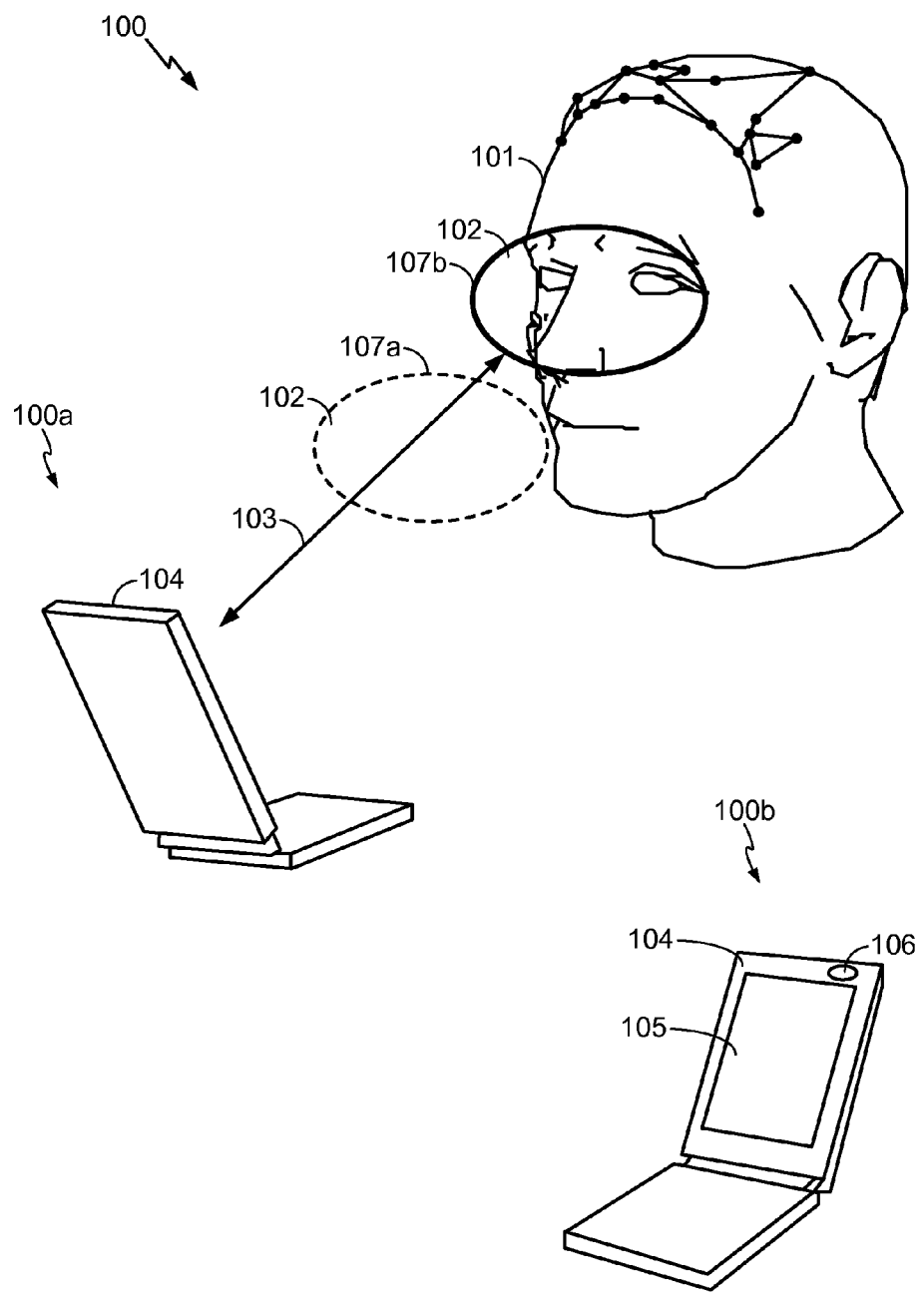
FIG. 2 illustrates a possible system for depicting a three-dimensional image to a user using various of the disclosed embodiments.

FIG. 2 illustrates one possible system 100 for depicting a three-dimensional image to a user. A device, such as a mobile device 104, may be located a distance 103 from the user. The mobile device may comprise a DVD player, cell phone, tablet computer, personal computer, laptop, or the like. As illustrated in the configuration 100a, a stereoscopic focus position 102 may be located along the vector 103. When the user 101's eyes are placed generally within the region of stereoscopic focus position 102, the user may perceive the stereoscopic effect or may perceive the stereoscopic effect more optimally than in other positions.

In configuration 100b, mobile device 104 is rotated 180 degrees from the position in configuration 100a. As illustrated in the configuration of 100b, the mobile device 104 may comprise a viewscreen 105 and a camera 106. The viewscreen 105 may comprise a mask to selectively obscure various pixels as described in greater detail below. This masking may facilitate generation of the stereoscopic effect from the user's perspective. The mask may comprise any suitable material for preventing the user from viewing the image pixels. Camera 106 may be used for video conferencing, image capture, etc. and may be placed relative to viewscreen 105 for these purposes.

Certain of the present embodiments contemplate using a camera, such as camera 106, to determine the location of, and the spacing between, the viewer 101's eyes. These embodiments further contemplate adjusting a mask located on or near screen 105 such that the stereoscopic focus position 102 tracks the movement of the user's eyes. The location of the user's eyes may be determined using facial and/or object recognition techniques applied to video or images captured using camera 106. The system may use a face tracking algorithm to determine the spacing between the viewer's eyes and the location of the viewer's eyes relative to the 3D display 105. In addition to the face tracking algorithm, the system may use an eye detection algorithm such as may be found in blink detection best shot algorithms. Some mobile devices, such as mobile phones, may include blink detection best shot algorithms as part of an application programming interface (API) or other common repository of software tools. Once the system determines the position of the user's eyes, the system may then dynamically adjust the mask over screen 105 such that the stereoscopic focus position 102 follows the location of the user's eyes. For example, if the stereoscopic focus position 102 were originally located at the position 107a, the system may subsequently move the stereoscopic focus position 102 to the position 107b so as to include the user's eyes. The stereoscopic focus position 102 may be moved both along the vector 103 and along an offset orthogonal to the vector by adjusting the mask using techniques such as those described in greater detail below.

As the viewer moves to the left or right of the display center, the location of the mask with respect to the even and odd pixels may be moved left or right to keep only the even or odd pixels exposed to the left or to the right eye. As the viewer moves closer/further from the display (or to account for different eye spacing between different viewer's eyes), the mask may be moved closer or further from the display to correctly mask the pixels. Alternatively the width of the mask can be changed to prevent the viewer's eyes from seeing the unintended pixels. Finally a combination of mask width and distance adjustments can also be used to place the sweet spot at a more optimal position.

By dynamically tracking the location and eye spacing of the viewer to adjust the location of the mask it is possible to significantly increase the size of the 3D viewing area. This may reduce strain on the viewer. Furthermore, the system improves the performance of applications which anticipate the user 101 moving their head relative to the display 105. For example, applications which present objects in a 3D environment from a different view depending on the relative position of the user will present a more effective image using the present embodiments.

Certain of the present embodiments contemplate a mask adjustment system which includes a facial identification system. The facial identification system may determine the position of the user's eyes and the relative spacing of the eyes relative to one another. The system may then adjust the mask to reorient the stereoscopic focus position to a position more favorable for creating the 3D effect for the user. As the user moves, the system may update the stereoscopic focus position in real-time to track the user's movement. In this manner, the system may provide a continuous 3D effect for the user, even as the user moves relative to the 3D display. Although face and eye identification may be determined using dedicated hardware, certain embodiments contemplate repurposing existing functionality on a mobile device for use with the mask adjustment system. For example, if a cell phone already includes firmware or software for performing face and eye identification as part of a red-eye removal process, the system may reuse these components as part of the mask displacement operations. Similarly, rather than including a new, dedicated camera for the mask adjustment, the system may reuse a general purpose camera already present on the mobile device 104 (such as a camera on a mobile phone), which may already face the user when the user views the screen.

Some embodiments may consider the relative motion between the user and the mobile device when recalibrating the location of the mask. That is, natural hand motion may continuously vary the relationship between the user and the display. Accordingly, the system may also review a sequence of image captures to determine the variations in the relative position as a consequence of hand motion, as well as gyroscopic and acceleration information.

Translation in the Plane of the Display

Figure 3:
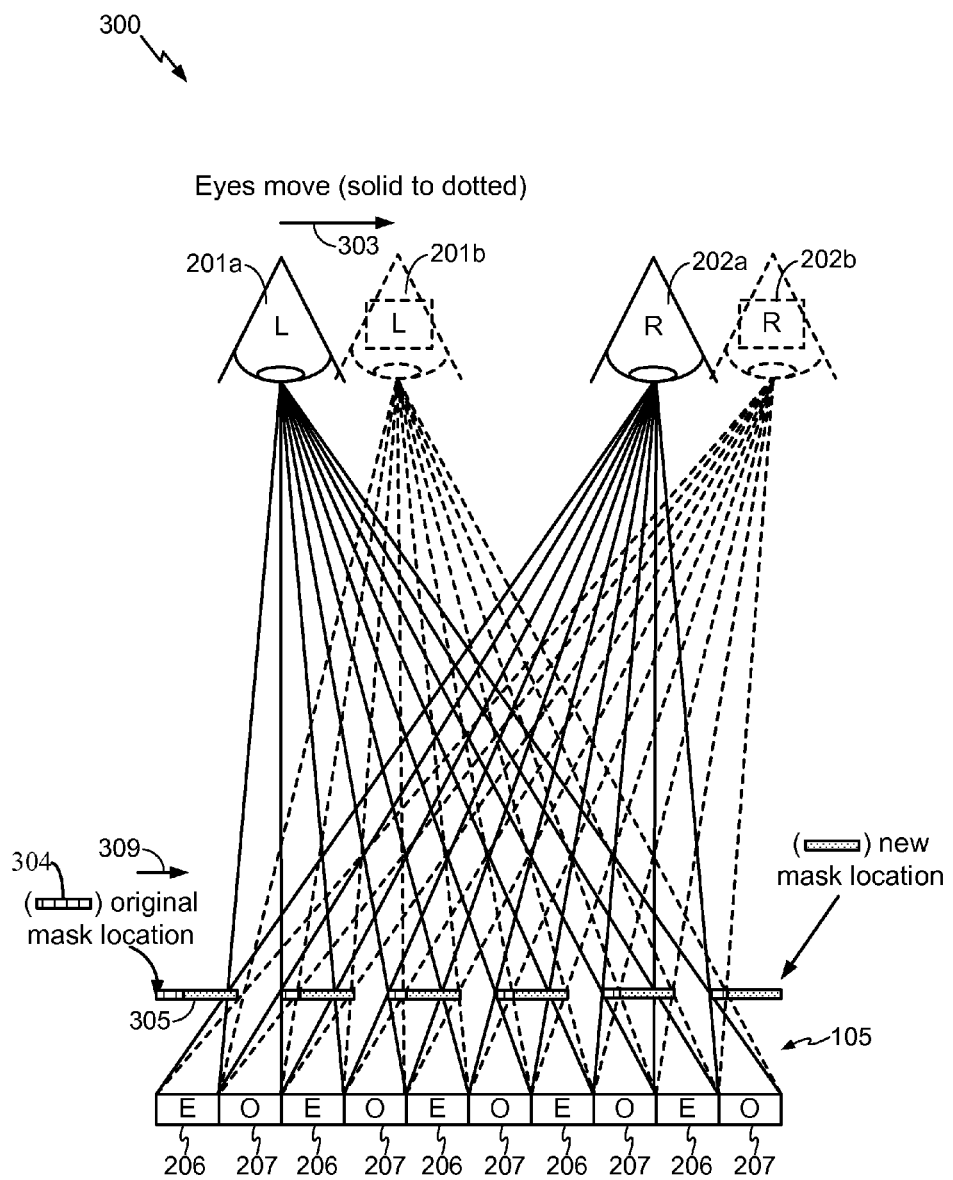
FIG. 3 illustrates a configuration wherein certain of the present embodiments are used to track the lateral movement of the user's eyes with the mask, so as to maintain the user's eyes within the stereoscopic focus position.

FIG. 3 illustrates a configuration 300 wherein the user's eyes in positions 201a, 201b translate a distance 303 to the right to the positions 201b and 202b respectively. Present embodiments contemplate a movable mask which will move from the position 304 to the position 305, in response to tracking the movement and spacing of the user's eyes. In this manner, the even 206 and odd 207 pixels continue to be selectively obscured such that the user still perceives the three-dimensional effect, or continues to perceive the tree-dimensional effect in a more optimal manner. In effect, the mask moves the stereoscopic focus position to the right or to the left when the mask is moved to the left or to the right, respectively. Note that the lateral translation of the mask 309 may be substantially smaller than the corresponding translation 303 of the user's eyes. In some embodiments the separation of the divisions within the mask may be adjusted as well as a consequence of the user's motion.

Translation Orthogonal to the Plane of the Display

Figure 4:
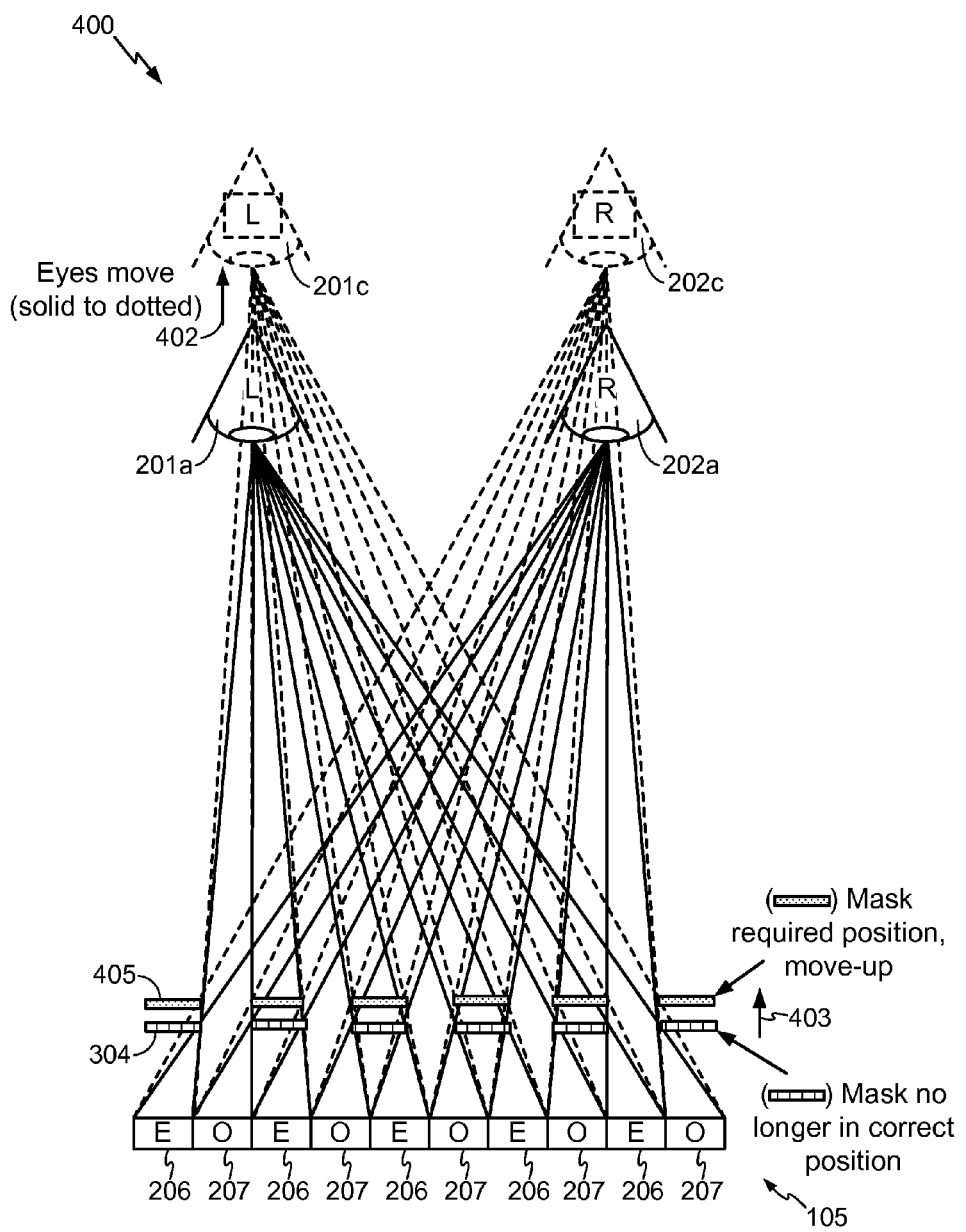
FIG. 4 illustrates a configuration wherein certain of the present embodiments are used to track the movement of the user's eyes toward and away from the display with movement of the mask, so as to maintain the user's eyes within the stereoscopic focus position.

FIG. 4 illustrates a configuration 400 wherein the positions of the user's eyes 201a, 201b translate a distance 402 away from the display 105 to the positions 201c and 202c respectively. Present embodiments contemplate a movable mask which will move from the position 304 to the position 405, in response to tracking one or more of the movement and spacing of the user's eyes. In this manner, the even 206 and odd 207 pixels continue to be selectively obscured by the mask such that the user still perceives the three-dimensional effect. In effect the mask moves the stereoscopic focus position 102 further from the display 105 as the user moves further from the display and moves the stereoscopic focus position 102 closer to the display 105 as the user's eyes move closer to the display. Note that the translation distance 403 of the mask may be substantially smaller than the corresponding translation distance 402 of the user's eyes.

Masking Translation Process

Figure 5:
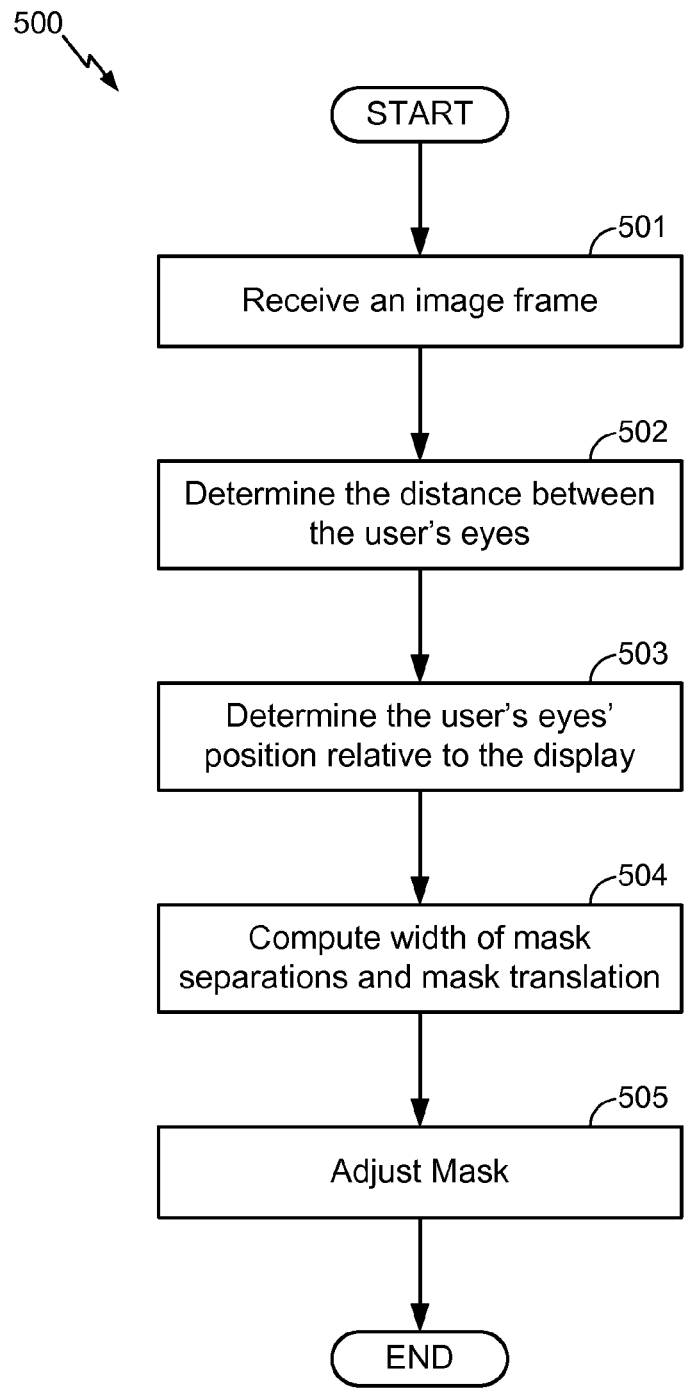
FIG. 5 illustrates a flow diagram depicting various steps in the mask adjustment process as implemented in certain of the embodiments.

FIG. 5 illustrates a flow diagram depicting various steps in the mask translation process as may be implemented in certain embodiments. At step 501, the system may receive an image frame by polling camera 106, or by analyzing a recently acquired image from camera 106. In some embodiments the system may extract an image frame from a sequence of frames or from a video stream. As discussed above, the system may employ general purpose components for this operation. For example, hardware and software may already exist inside a mobile phone for capturing images of the user's face. This hardware and software may be used for virtual conferencing and similar functionality. Certain of the present embodiments may employ this same hardware and/or software for the particular purpose of mask adjustment, such as is discussed with reference to the operations in FIG. 5. One will recognize that this general hardware/software, specifically designed hardware/software, or other means for receiving an image from the camera will be readily recognized by one skilled in the art.

At step 502, the system may determine the distance between the user's eyes. In some embodiments, this step may be unnecessary, if the distance between the user's eyes was previously recorded (in which case the system may refer to the previously recorded value). In some embodiments the system may maintain profiles of different users which include information regarding the particular user's distance between their eyes. The width between the user's eyes may be "absolute" or "relative". An "absolute" determination of width would determine the physical width between the user's eyes which does not change with the user's position. Such an absolute determination may be assumed or inferred, such as from an average over many user faces. Alternatively, the user may calibrate the system by taking a picture of their face when the camera is a known distance from their face. The "absolute" determination of width could then be inferred from this image capture (by comparing the observed width with the known distance to the user's face). A "relative" determination, in contrast, would determine the distance between the user's eyes as the user's eyes appear from the position of the camera. That is, the user's eyes will appear further apart when the user's face is closer to the camera. Conversely, the user's eyes appear closer together when the user's face is further from the camera. Comparison of the relative and absolute width determinations may be used to infer the distance from the user's face to the camera. The relative position of the camera and screen may then be used to infer the distance from the user's face to the screen. Use of these image processing techniques, or other location and width determining means, may be readily determined by one skilled in the art.

At step 503, the system may determine the distance from the display 105 to the user's eyes. As mentioned, the process may use facial tracking techniques in conjunction with knowledge of the relative position of the camera 106 on the display device 104. The system may thereby determine the position of the user's eyes relative to the display 105, for example, by comparing the absolute and relative widths of the user's eyes as discussed above.

At step 504, the system may determine widths separating portions of the mask and/or a mask translation vector necessary to reorient the stereoscopic focus position to the user's eyes. In some embodiments, the process may instead end without performing this step if the user's eyes have not moved a sufficient distance since a previous adjustment of the mask. The system may consider the relative position of the camera 106 and display 105 on the device 104 when determining the translation and separation values for the mask. As discussed above, the translation of the mask may be substantially less than the translation of the user's face. In some embodiments, the relationship between translation of the user's face and translation of the mask may be encoded as a proportional function. For example, movement of the mask may be a scaled percentage of the movement of the user's face. Accordingly, step 504 may simply comprise referencing a lookup table of values which indicate translation vectors and separation widths which correspond to a particular distance from the user's face to the screen.

At step 505, the system may then implement the determined mask adjustments, by directing one or more actuators to translate the mask and to adjust the width of the mask's separations as determined at step 504. The actuators may comprise motors (piezoelectric, voice coil, micro-mechanical, conventional electric, etc.), servos, levers, liquid crystal electrodes, or any other means for adjusting the position of the mask. FIGS. 6-9 provide a plurality of means for masking a display, such as physical barriers, liquid crystal components, polarized barriers, etc. FIGS. 6-9 also provide a plurality of means for moving a stereoscopic focus position, such as piezoelectric motors, voice coil motors, MEMs (micro-mechanical system) motors, conventional electric motors, or the like.

Near-Far Mask Adjustment, Embodiments A

Figure 6:
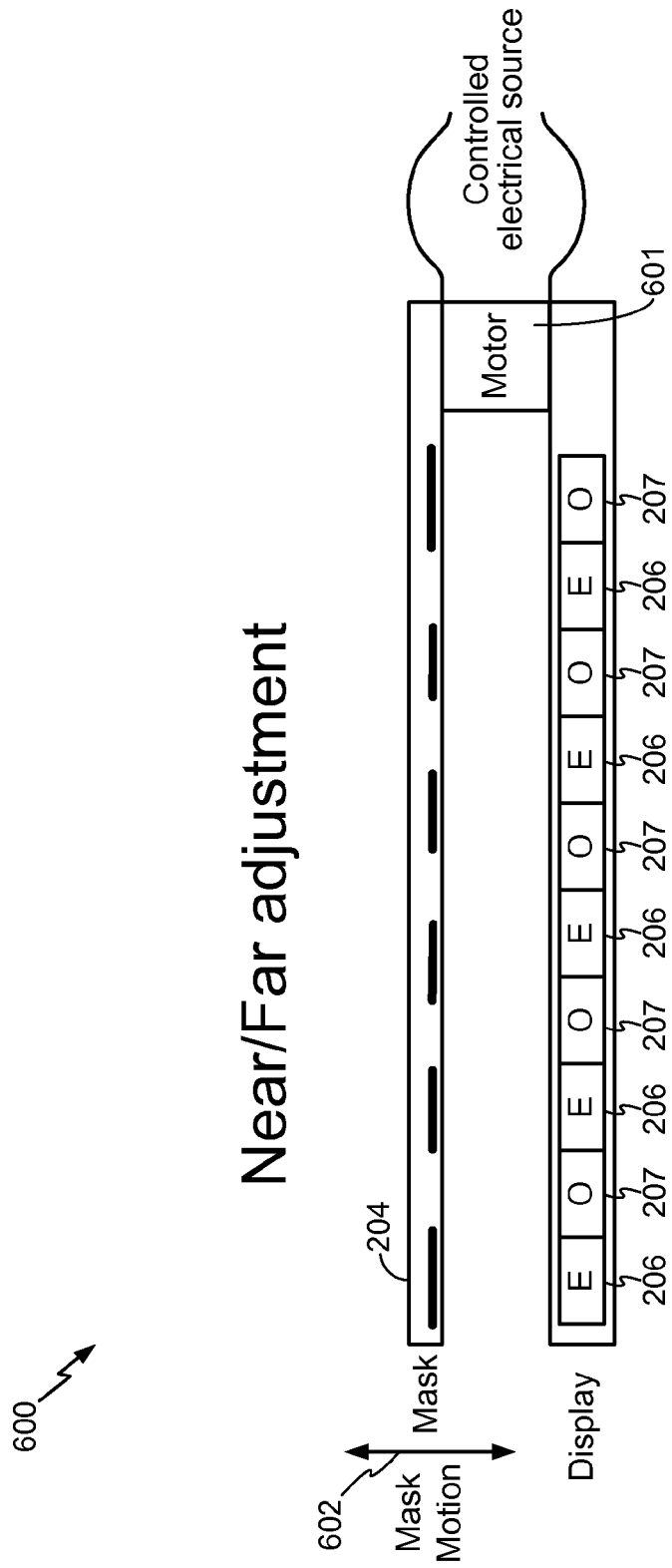
FIG. 6 illustrates an embodiment facilitating near-far mask adjustment.

FIG. 6 illustrates an embodiment facilitating near-far mask adjustment. The display and mask are on separate substrates. In certain of these embodiments, the distance from the mask to the display can be physically moved by a motor 601. The motor 601 may comprise a piezoelectric, voice coil, MEMs, conventional electric motor, or the like. For example, by applying an electrical field to a piezocrystal the crystal size will change causing the separation between the mask and display to change. Single or multiple piezoelectric crystals may be placed around the perimeter of the mask to facilitate movement in one or more directions. As another example, voice coil motors may be arranged in a similar manner to the piezoelectric crystals. As yet another example, a MEMs motor may drive a mechanical actuator which may include sliding wedges, a screw, a geartrain, a cam, or the like. A conventional motor may also be used to drive a similar or the same mechanical actuator. One will readily recognize alternative methods for increasing the separation between the display and the mask as are readily known in the art.

Near-Far Mask Adjustment, Embodiments B

Figure 7:
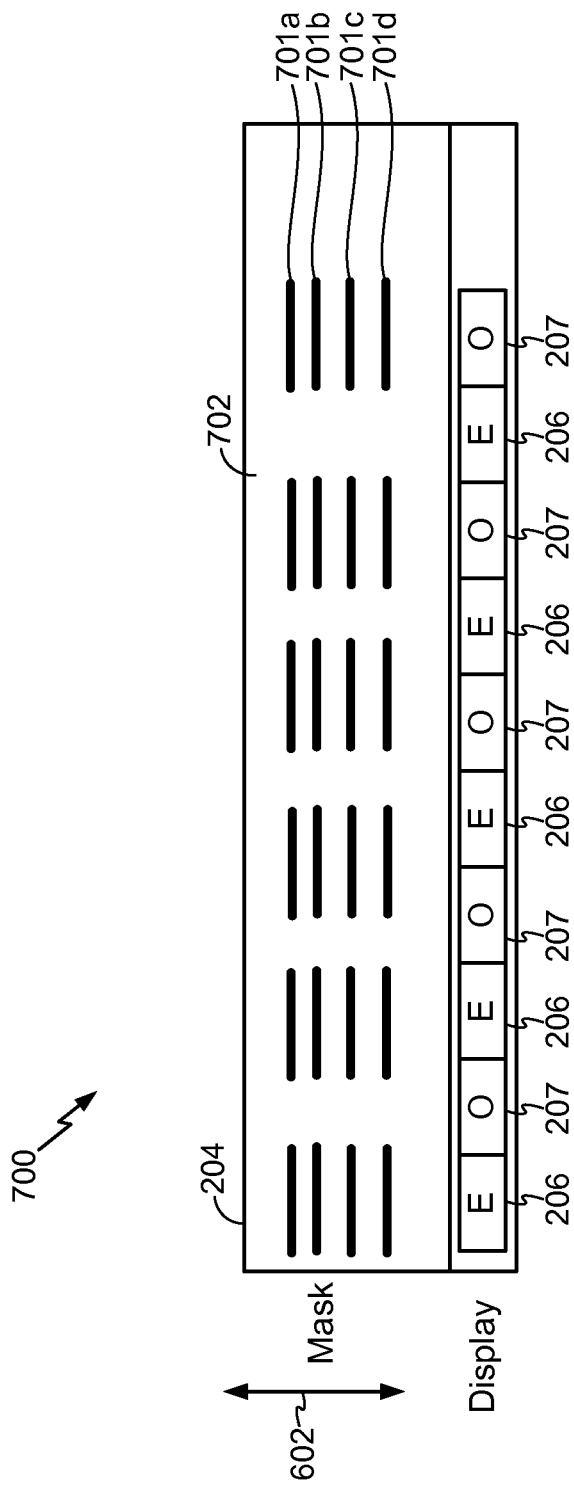
FIG. 7 illustrates another embodiment facilitating near-far mask adjustment.

FIG. 7 illustrates another embodiment facilitating near-far mask adjustment. In this embodiment, rather than physically moving a single mask layer, the apparatus comprises a plurality of mask layers 701a-d within substrate 702. Together, these layers may operate to serve as a single mask 204. Mask layers 701a-d may comprise a liquid crystal display, MEMS modulator, or similar technology. The distance between the display and mask layer may be adjusted by selectively activating and deactivating masks 701a-d. That is, a single one of mask layers 701a-d may be active while the other layers are inactive. Activating a mask may comprise providing/removing a current, or mechanical force, such that one or more of the elements within the layer 701a-d become opaque. Conversely, deactivating a mask may comprise removing/providing a current or mechanical force, such that one or more of the elements within the layers 701a-d allow visible light to pass through the mask and to reach the viewer. The layers may not prevent the transmission of light entirely, but may simply prevent transmission of those frequencies visible to the viewer.

Lateral Mask Adjustment, Embodiments A

Figure 8:
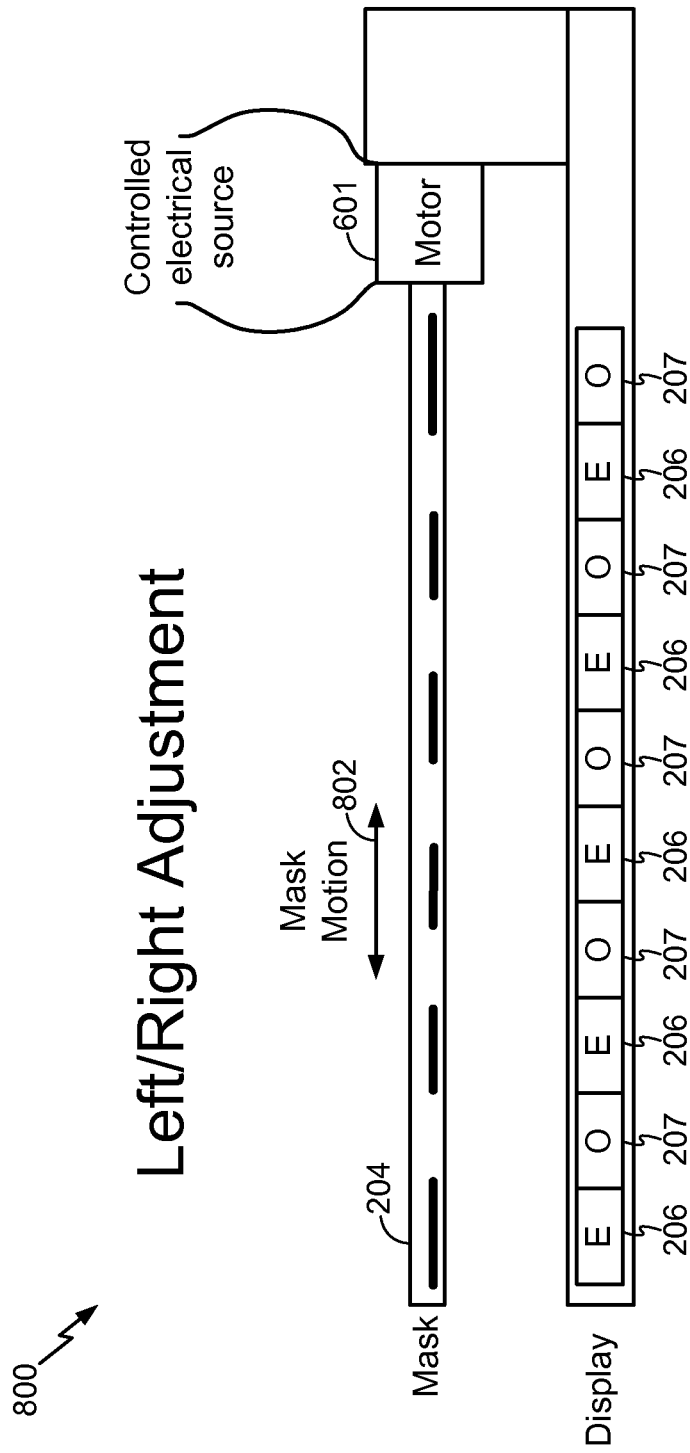
FIG. 8 illustrates an embodiment facilitating left-right, or lateral, mask adjustment.

FIG. 8 illustrates an embodiment facilitating left-right, or lateral, mask adjustment. As in the embodiment of FIG. 6, the display and mask are on separate substrates. The distance from the mask to the display can be physically moved by a motor. The motor 601 may comprise a piezoelectric, voice coil, MEMs, conventional electric motor, or the like. As discussed above, by applying an electrical field to a piezocrystal the crystal size will change causing the separation between the mask and display to change. However, because the motor 601 is between the mask 204 and a surface projecting from the display substrate, the mask 204 will move laterally, rather than vertically. Single or multiple piezoelectric crystals may be placed around the perimeter of a substrate orthogonal to the plane of the display. As another example, voice coil motors may be arranged in a similar manner to the piezoelectric crystals. As yet another example, a MEMs motor may drive a mechanical actuator which may include sliding wedges, a screw, a geartrain, a cam, or the like. A conventional motor may also be used to drive a similar or the same mechanical actuator. One will readily recognize alternative methods for increasing the separation between the display and the mask as are readily known in the art.

Lateral Mask Adjustment, Embodiments B

Figure 9:
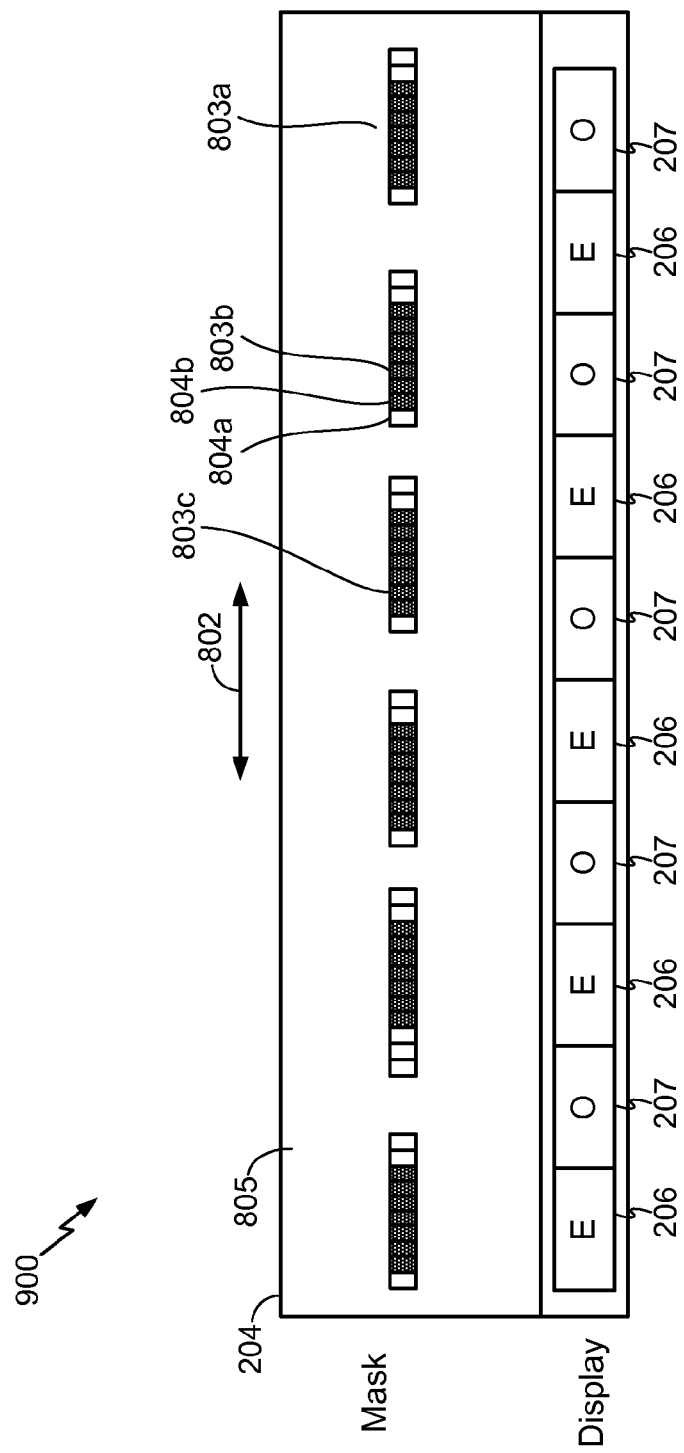
FIG. 9 illustrates another embodiment facilitating left-right, or lateral, mask adjustment.

FIG. 9 illustrates another embodiment facilitating left-right, or lateral, mask adjustment. In this embodiment, rather than physically moving a single mask layer, the apparatus comprises a plurality of mask layer segments 803*a-c* within substrate 805. Mask layer segments 803*a-c* may comprise liquid crystal elements, MEMs modulators, or similar technology. Within each of layer segments 803*a-c* is a plurality of cells 804*a-b* which may be individually activated or deactivated. For example, cell 840*a* as depicted in FIG. 9 is inactivated while cell 840*b* is activated. When activated, the cells may prevent light from passing from display pixels 206, 207. In this manner, consecutive cells may be inactivated or deactivated to facilitate lateral adjustment of mask segments. Although the segments 803*a-c* are illustrated with gaps between one another in FIG. 9, one will recognize that in some embodiments these gaps may be extremely small or nonexistent to facilitate complete masking of even or odd pixels in the display. One will recognize that the embodiments of FIGS. 6-9 may be readily combined to achieve both lateral and horizontal mask movement.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A computer-implemented method for rendering a stereoscopic effect for a user, the method comprising:
   receiving an image, the image containing a portion of the user's face;
   determining a width between the user's eyes based on the image;
   determining a relative distance from the user's eyes to a 3D display based on the determined width; and
   moving a stereoscopic focus position from a first position to a second position by adjusting a distance of a mask to the 3D display based on (i) the determined relative distance, (ii) the determined width, and (iii) at least one of gyroscopic and acceleration information indicative of variations in a relative position of the 3D display with respect to the user, the relative position of the 3D display with respect to the user being different from the determined relative distance, wherein adjusting the distance of the mask to the 3D display comprises adjusting the mask such that movement of the mask is a scaled percentage of movement of the user's face, the user's eyes, or both.

2. The method of claim 1, wherein the second position corresponds to a location of the user's eyes.

3. The method of claim 1, wherein the first position is further from the 3D display than the second position and adjusting the distance of the mask will comprises moving the mask closer to the 3D display.

4. The method of claim 1, wherein adjusting the distance of the mask further comprises modifying a distance between separations within the mask.

5. The method of claim 1, wherein determining the relative distance is based on the image.

6. The method of claim 1, wherein determining the relative distance comprises retrieving location information from a memory.

7. A device for rendering a stereoscopic effect for a user, the device comprising:
 a camera;
 a display configured to display a stereoscopic image pair;
 a mask over the display; and
 a control module configured to
  receive an image from the camera, the image containing a portion of the user's face;
  determine a width between the user's eyes based on the image;
  determine a relative distance from the user's eyes to the display based on the determined width; and
  move a stereoscopic focus position from a first position to a second position by adjusting a distance of the mask to the display based on (i) the determined relative distance, (ii) the determined width, and (iii) at least one of gyroscopic and acceleration information indicative of variations in a relative position of the display with respect to the user, the relative position of the display with respect to the user being different from the determined relative distance, wherein adjusting the distance of the mask to the display comprises adjusting the mask such that movement of the mask is a scaled percentage of movement of the user's face, the user's eyes, or both.

8. The device of claim 7, wherein the second position corresponds to a location of the user's eyes.

9. The device of claim 7, wherein the first position is further from the display than the second position and adjusting the distance of the mask comprises moving the mask closer to the display.

10. The device of claim 7, wherein adjusting the mask further comprises modifying a distance between separations within the mask.

11. The device of claim 7, wherein determining the relative distance is based on the image.

12. The device of claim 7, further comprising a memory, and wherein determining the relative distance comprises retrieving location information from the memory.

13. A non-transitory computer-readable medium having stored thereon instructions that, when executed, cause a processor of a device to:
 receive an image, the image containing a portion of the user's face;
 determine a width between the user's eyes based on the image;
 determine a relative distance from the user's eyes to a 3D display based on the determined width; and
 move a stereoscopic focus position from a first position to a second position by adjusting a distance of a mask to the 3D display based on (i) the determined relative distance, (ii) the determined width, and (iii) at least one of gyroscopic and acceleration information indicative of variations in a relative position of the 3D display with respect to the user, the relative position of the 3D display with respect to the user being different from the determined relative distance, wherein adjusting the distance of the mask to the 3D display comprises adjusting the mask such that movement of the mask is a scaled percentage of movement of the user's face, the user's eyes, or both.

14. The non-transitory computer-readable medium of claim 13, wherein the second position corresponds to a location of the user's eyes.

15. The non-transitory computer-readable medium of claim 13, wherein the first position is further from the 3D display than the second position and adjusting the distance of the mask comprises moving the mask closer to the 3D display.

16. The non-transitory computer-readable medium of claim 13, wherein the adjusting of the mask further comprises modifying a distance between separations within the mask.

17. The non-transitory computer-readable medium of claim 13, wherein the determining of the relative distance from the user's eyes to the 3D display is based on the image.

18. The non-transitory computer-readable medium of claim 13, wherein the determining of the relative distance from the user's eyes to the 3D display comprises retrieving location information from a memory.

19. A device for rendering a stereoscopic effect for a user, the device comprising:
 a camera;
 means for displaying a stereoscopic image pair;
 means for masking the means for displaying; and
 means for receiving an image from the camera, the image containing a portion of the user's face;
 means for determining a width between the user's eyes based on the image;
 means for determining a relative distance from the user's eyes to the means for displaying based on the determined width; and
 means for moving a stereoscopic focus position from a first position to a second position by adjusting a distance of the masking means to the means for displaying based on (i) the determined relative distance, (ii) the determined width, and (iii) at least one of gyroscopic and acceleration information indicative of variations in a relative position of the means for displaying with respect to the user, the relative position of the 3D display with respect to the user being different from the determined relative distance, wherein adjusting the distance of the masking means to the means for displaying comprises adjusting the masking means such that movement of the masking means is a scaled percentage of movement of the user's face, the user's eyes, or both.

20. The device of claim 19, wherein the means for displaying comprises a display, the means for masking comprises a mask, the means for receiving comprises a software module, the means for determining the relative distance from the user's eyes to the means for displaying comprises a software module, the means for determining the width between the user's eyes comprises a software module, and the means for moving comprises a software module configured to operate an actuator.

21. The device of claim 19, wherein the second position corresponds to a location of the user's eyes.

22. The device of claim 19, wherein the first position is further from the means for displaying than the second position and adjusting the distance of the means for masking comprises moving the means for masking closer to the means for displaying.

23. The device of claim 19, wherein adjusting the means for masking further comprises modifying a distance between separations within the means for masking.

24. The device of claim 19, wherein determining the relative distance from the user's eyes to the means for displaying based on the determined width is based on the image.

25. The device of claim 19, wherein the determining relative distance from the user's eyes to the means for displaying based on the determined width further comprises retrieving location information from a memory.

* * * * *